United States Patent [19]
Fujita

[11] Patent Number: 5,909,659
[45] Date of Patent: Jun. 1, 1999

[54] MEASUREMENT METHOD FOR OPTICAL SHORT-PULSE WAVEFORM

[75] Inventor: Shinya Fujita, Tokyo, Japan

[73] Assignee: Advantest Corporation, Tokyo, Japan

[21] Appl. No.: 08/807,636

[22] Filed: Feb. 27, 1997

[30] Foreign Application Priority Data

Mar. 8, 1996 [JP] Japan .................................... 8-051742

[51] Int. Cl.⁶ ................................................. G01J 11/00
[52] U.S. Cl. .......................... 702/189; 356/346; 359/244
[58] Field of Search ........................... 702/189; 356/346, 356/28; 359/122, 138, 244; 250/574

[56] References Cited

U.S. PATENT DOCUMENTS 5,033,853   7/1991   Frangineas, Jr. ........................ 356/346
5,805,327   9/1998   Usami et al. ............................ 359/244

*Primary Examiner*—Kamini Shah
*Attorney, Agent, or Firm*—Oblon, Spivak, McClelland, Maier & Neustadt, P.C.

[57] ABSTRACT

The present invention is directed toward realizing a measurement method that enables finding the intensity waveform of optical short-pulse as well as the change in chirp frequency over time at a high resolution. Such a method involves irradiating an optical short-pulse that is to be measured at a delay time $\tau$ upon a first photoconductor that enters a conductive state when irradiated by light and upon a second photoconductor that enters a conductive state only when irradiated by light while the first photoconductor is in a conductive state. In this way, the autocorrelation waveform of optical short-pulse that is to be measured is found; the result $F(\omega)$ of a Fourier transform of the autocorrelation waveform of optical short-pulse to be measured is found; and this result is divided by the result of a Fourier transform of the cross-correlated waveform $h_{12}(\tau)$ of the impulse response waveform $h_1(t)$ of the first photoconductor and the impulse response waveform $h_2(t)$ of the second photoconductor to find the intensity power spectrum $|I(\omega)|^2$ from which the response characteristics of the photoconductors are eliminated, and finding short-pulse waveform from above-described $|I(\omega)|^2$ and field power spectrum $|E(\omega)|^2$.

2 Claims, 4 Drawing Sheets

MEASUREMENT METHOD FOR OPTICAL SHORT-PULSE WAVEFORM

BACKGROUND OF THE INVENTION

1. Field of the Invention

The present invention relates to a method of reproducing the phase-change waveform and intensity waveform of optical short-pulse in the time domain that combines measurement of the autocorrelation waveform of optical short-pulse using two photoconductors with field power spectrum measurement using an optical spectrum analyzer.

2. Description of the Related Art

Developments in the field of ultra-high-speed optical communication have increased the need for the measurement of the intensity waveform of optical short-pulse as well as the measurement of change in chirp frequency over time. The conventional method of measuring the intensity waveform of optical short-pulse involves the use of two photoconductors.

FIG. 1 shows a prior-art measurement system of an autocorrelation waveform employing photoconductors. Explanation of this measurement method will refer to this figure.

The generation source 402 of optical short-pulse that is to be measured generates a line of optical short-pulse to be measured at the timing of the rise or fall of output signals generated by signal generation source 401. This line of optical short-pulse that is to be measured is modulated by passage through optical ON/OFF shutter 404 which turns ON and OFF in synchronism with low-frequency (several 10 Hz to several 100 Hz) pulse signals generated at function generator 403.

The line of optical short-pulse that is to be measured following modulation by passage through optical ON/OFF shutter 404 is divided into two branches by half-mirror 405, one branch being irradiated into first photoconductor 408 directly (or by way of a fixed mirror), and the other branch being irradiated into second photoconductor 409 by way of movable mirror 407.

First photoconductor 408 and second photoconductor 409 enter a conductive state if irradiated by light when in a state in which a phase difference occurs between both ends. As shown in the figure, second photoconductor 409 enters a conductive state only when light is irradiated onto first photoconductor 408, and as a result, an autocorrelation waveform can be obtained by conferring delay times to each photoconductor and irradiating optical pulses.

Movable mirror 407 is mounted on XY stage 406 which is driven by stage driver 412. By controlling stage driver 412 so as to shift XY stage 406 according to the state of the input to lock-in amplifier 411 of output signals arising at sampling output terminal 410 of second photoconductor 409, the value of a delay time τ, which is the difference in signal input time to first photoconductor 408 and second photoconductor 409, can be gradually varied. Here, the pulse output of function generator 403 is inputted to lock-in amplifier 411 as a reference signal.

The output of lock-in amplifier 411 at this time is substantially equal to the autocorrelation waveform of the optical pulse intensity waveform, and this output is taken in by way of CPU 413 and displayed on data display 414.

The above-described measurement method measures the autocorrelation waveform and therefore is not influenced by jitter. As a result, measurement can theoretically be achieved at a resolution on the order of several femtoseconds by employing photoconductors of extremely high-speed response.

In measurement according to the above-described prior art, the object of measurement is nevertheless the autocorrelation waveform l(τ) of optical short-pulse, and therefore, what is found from this autocorrelation data is limited to the power spectrum $|I(\omega)|^2$ of the intensity waveform i(τ) of optical short-pulse. Accordingly, the measurement method of the above-described prior art is limited to finding only an approximation of the half-width of the optical short-pulse, and has the shortcomings of not enabling measurement of the intensity waveform itself of optical pulses, and of not enabling measurement of the intensity waveform of optical short-pulse or the change of chirp frequency over time.

SUMMARY OF THE INVENTION

In view of the above-described problems of the prior art, the object of the present invention is to realize a measurement method that enables measurement at high resolution of both the intensity waveform of optical short-pulse as well as the phase-change waveform over time, i. e., the change in chirp frequency over time.

The optical short-pulse intensity waveform measurement method according to the present invention finds the autocorrelation waveform of optical short-pulse to be measured by irradiating, at a delay time τ, the optical short-pulse to be measured onto a first photoconductor that enters a conductive state when irradiated by light, and onto a second photoconductor that enters a conductive state only when irradiated by light at a time when the first photoconductor is also in a conductive state;

and is characterized by finding the result F(ω) of a Fourier transform of the autocorrelation waveform of optical short-pulse to be measured; and dividing this result by the result of a Fourier transform of the cross-correlated waveform $h_{12}(\omega)$ of the impulse response waveform $h_1(t)$ of the first photoconductor and the impulse response waveform $h_2(t)$ of the second photoconductor to find the intensity power spectrum $|I(\omega)|^2$ from which response characteristics of the photoconductors have been eliminated.

The optical short-pulse waveform reproduction method according to the present invention is a method of reproducing a short-pulse waveform to be measured using the field power spectrum $|E(\omega)|^2$ and the intensity power spectrum $|I(\omega)|^2$ from which the response characteristics of the photoconductors have been eliminated obtained according to the above-described method; and is characterized by:

calculating the value of the square root of the field power spectrum, and moreover, again representing as $|E(\omega)|$ the result of shifting the square root exactly by an amount equal to the center frequency $\omega_0$ of optical short-pulse in the direction of the negative frequency axis, setting an initial value $\phi_i(\omega)$ appropriate to this phase $\phi(\omega)$, and finding complex number E(ω) from $|E(\omega)|$ and $\phi(\omega)$; finding field waveform e(t) in the time domain by a inverse fast Fourier transform of complex number E(ω);

finding the intensity waveform i(t) from the square of the complex absolute value of field waveform e(t);

finding a Fourier transform I'(ω) of the intensity waveform by a fast Fourier transform of intensity waveform i(t) and making the calculated value of the complex absolute value of this value $|I'(\omega)|$;

comparing calculated value $|I(\omega)|$ and measured value $|I(\omega)|$, taking the difference between the two values as an error value, gradually microvarying the value of phase $\phi(\omega)$ such that the error value decreases, and finding phase $\phi'(\omega)$ at which the error is a minimum; and finding complex number E(ω) from $|E(\omega)|$ and $\phi'(\omega)$ and calculating the solution of optical short-pulse field waveform e(t) through a inverse fast Fourier transform, and in addition, finding optical short-pulse intensity waveform i(t) from the square of the complex absolute value of e(t) or phase waveform in the time domain from e(t).

In addition, when the phase waveform in the time domain is obtained in the method of reproducing the waveform, the chirp frequency can be found by differentiating this value and dividing by $2\pi$.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENTS

An embodiment of the present invention will next be described with reference to the accompanying figures.

FIG. 2(a) shows the construction of a measurement system according to one embodiment of the present invention.

Figure 1:
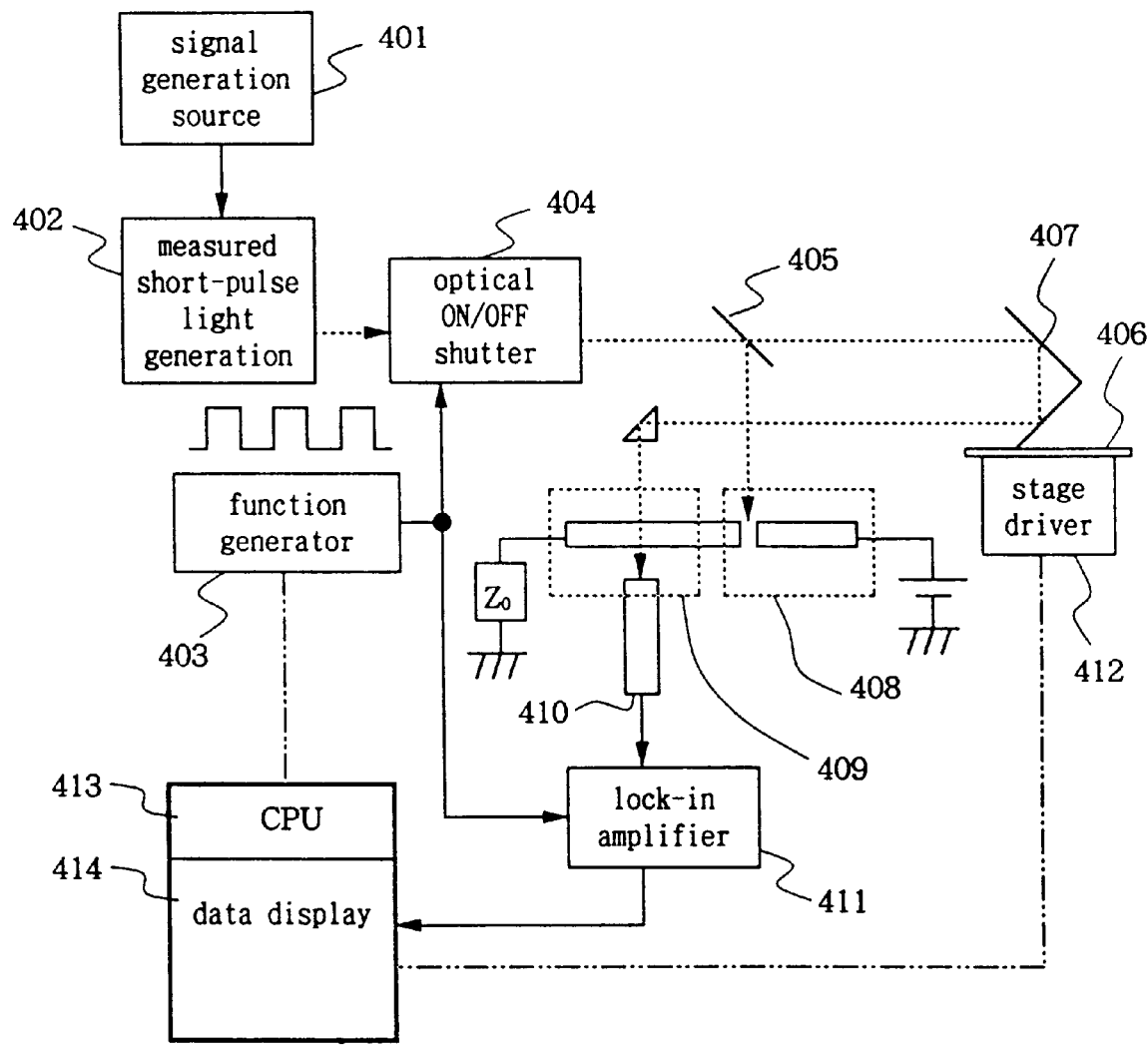
FIG. 1 shows the construction of an example of the prior art.

In FIG. 2(a), signal generator 101, measured optical short-pulse generation source 102, function generator 103, optical ON/OFF shutter 104, half-mirror 105, XY stage 106, movable mirror 107, first photoconductor 108, second photoconductor 109, sampling output terminal 110 of second photoconductor 109, lock-in amplifier 111, stage driver 112, CPU 113, and data display 114, are each equivalent to the respective signal generator 401, measured optical short-pulse generation source 402, function generator 403, optical ON/OFF shutter 404, half-mirror 405, XY stage 406, movable mirror 407, first photoconductor 408, second photoconductor 409, sampling output terminal 410, lock-in amplifier 411, stage driver 412, CPU 413, and data display 414 shown in FIG. 1, and explanation of these components is here omitted.

The present embodiment adopts a construction in which a field power spectrum measurement system has been added by providing the optical short-pulse autocorrelation waveform measurement system shown in FIG. 1 with waveform reproduction calculator 115, which is provided with a capability for fast Fourier transform and a capability for calculating by repeated inverse fast Fourier transform, and optical spectrum analyzer 116.

Figure 2:
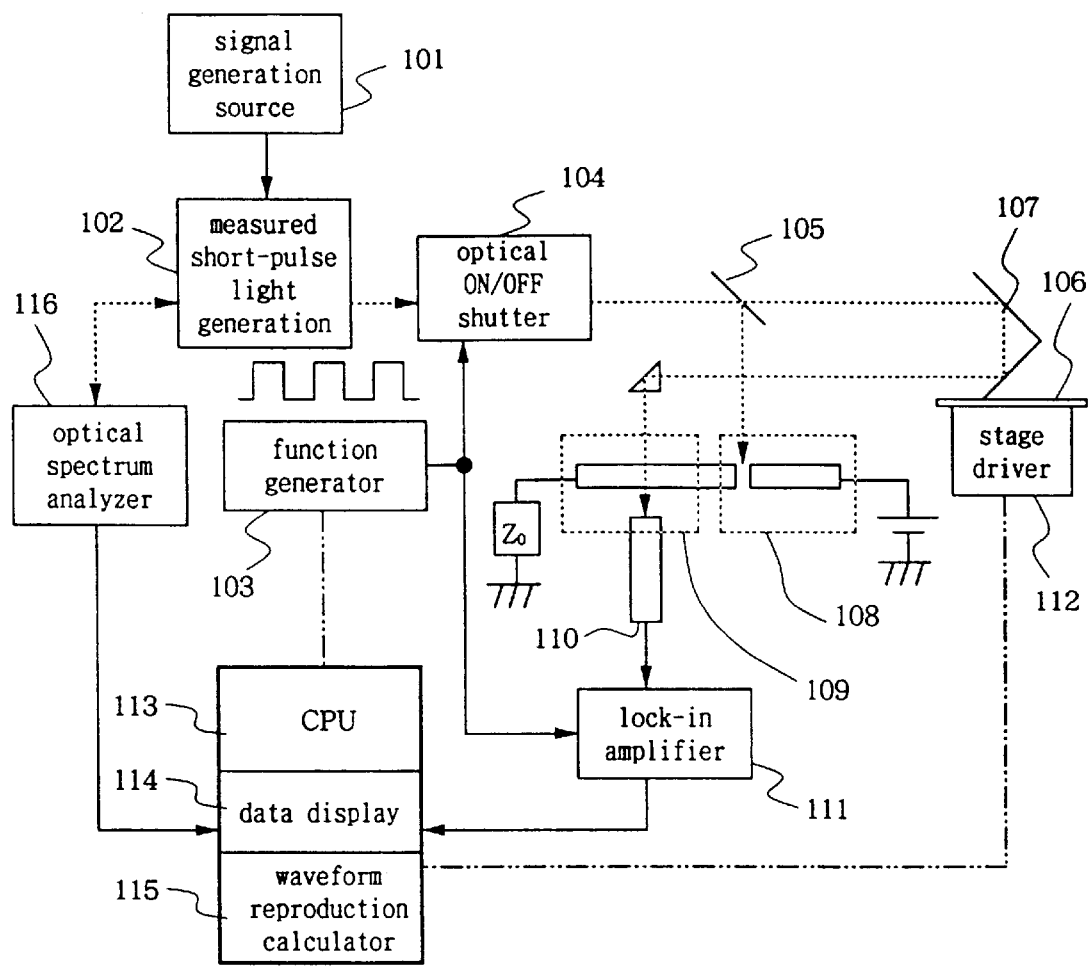
FIG. 2(a) shows the construction of a measurement system according to one embodiment of the present invention.
FIG. 2(b) is for illustrating the impulse response waveform of the photoconductors.
Figure 2:
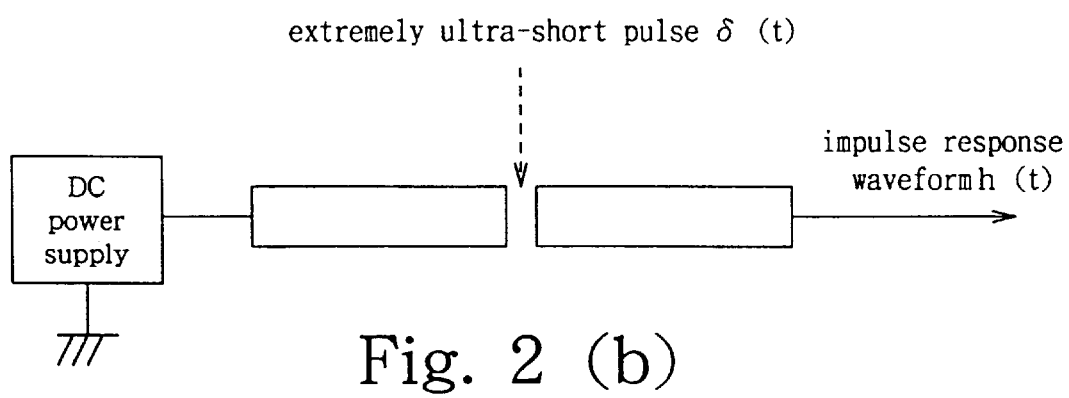

Basing the explanation on the measurement system shown in FIG. 2 (a), the result of a Fourier transform of the impulse response waveform $h_1(t)$ of first photoconductor 108 is $H_1(\omega)$, and the result of a Fourier transform of the impulse response waveform $h_2(t)$ of second photoconductor 109 is $H_2(\omega)$.

As shown in FIG. 2(b), the impulse response waveforms of the photoconductors described here are electric short-pulse waveforms outputted from one end of the photoconductors when the photoconductors are irradiated by light of an extremely ultra-short pulse, i.e., on the order of femtoseconds, during a state in which direct current voltage is applied to the other end of the photoconductors.

In addition, if the result of a Fourier transform of intensity waveform i(t) of the optical short-pulse to be measured is $I(\omega)$, the result of a Fourier transform $F(\omega)$ of the output waveform f(t) of lock-in amplifier 111 can be found from the following equation using $I(-\omega)=I^*(\omega)$ (wherein $I^*(\omega)$ represents the complex conjugate of $I(\omega)$):

$$F(\omega) \; (I(\omega) \cdot I-(\omega) \cdot H_1(\omega) \cdot H_2(-\omega) = |I(\omega)|^2 \cdot H_1(\omega) \cdot H_2(-\omega) \tag{1}$$

Accordingly, in order to find the true intensity power spectrum $|I(\omega)|^2$ of the short-pulse waveform from which the response characteristics of the photoconductors have been eliminated, the result of Fourier transform $F(\omega)$ can be divided by $H_1(\omega) \cdot H_2(-\omega)$, i.e., the result of a Fourier transform of the cross-correlated waveform $h_{12}(\tau)$ of the impulse response waveform $h_1(t)$ of first photoconductor 108 and the impulse response waveform $h_2(t)$ of second photoconductor 109.

The above-described cross-correlated waveform $h_{12}(\tau)$ can be measured as the output waveform of the lock-in amplifier when light of extremely ultra-short pulse is irradiated upon first photoconductor 108 and second photoconductor 109 at a mutual-time differential $\tau$, and the value of this $\tau$ is scanned continuously. Accordingly, the-value of the true intensity power spectrum $|I(\omega)|^2$ from which the response characteristics of the photoconductors have been eliminated can be found from equation (1).

Explanation will next be given regarding the field power spectrum $|E(\omega)|^2$.

First, the field waveform e(t) of optical short-pulse can be represented by the equation:

$$e(t) = e_1(t) \exp\{j \cdot \omega_0 \cdot t\} \tag{2}$$

in which $\omega_0$ represents the center frequency of optical short-pulse, and $e_1(t)$ represents amplitude that includes slowly varying phase.

When intensity I(t) and amount of phase change of light $\phi(t)$ are used, $e_1(t)$ can be represented as follows:

$$e_1(t) = [I(t)]^{1/2} \cdot \exp\{j \cdot \phi(t)\} \tag{3}$$

The result of a Fourier transform of equation (2) is:

$$E(\omega) = E_1(\omega - \omega_0) \tag{4}$$

Here, $E(\omega)$ and $E_1(\omega)$ represent the Fourier transform of e(t) and $e_1(t)$.

From equation (4), it can be seen that the power spectrum $|E_1(\omega)|^2$ of $e_1(t)$ is the power spectrum $|E(\omega)|^2$ of e(t) shifted by an amount equal to the center frequency $\omega_0$ in the negative direction of the frequency axis. As a result, the spectrum $|E_1(\omega)|^2$ is equivalent to the spectrum $|E(\omega)|^2$ in which the point $\omega = \omega_0$ is $\omega = 0$. Essentially, the power spectrum of field waveform $e_1(t)$ at $\omega_0$ which has no oscillation is considered.

As described hereinabove, the values of dispersed data values $|I(k)|^2$ of intensity power spectrum $|I(\omega)|^2$ can be determined from an lautocorrelation waveform measurement of optical short-pulse using photoconductors, and the dispersed data values $|E(k)|^2$ of the field power spectrum can be determined by shifting the field power spectrum $|E(\omega)|^2$ of optical short-pulse measured at optical spectrum analyzer 116 by an amount equal to the center frequency $\omega_0$ of light in the negative direction of the frequency axis (k being an integer 0, 1, 2, ..., N−1; and N being the number of fast Fourier transform operations).

A waveform of optical short-pulse that simultaneously satisfies the above-described spectrum data of $|E(k)|^2$ and $|I(k)|^2$ can be found through repeated operations of inverse fast Fourier transform and fast Fourier transform at waveform reproduction calculator 115.

Figure 3:
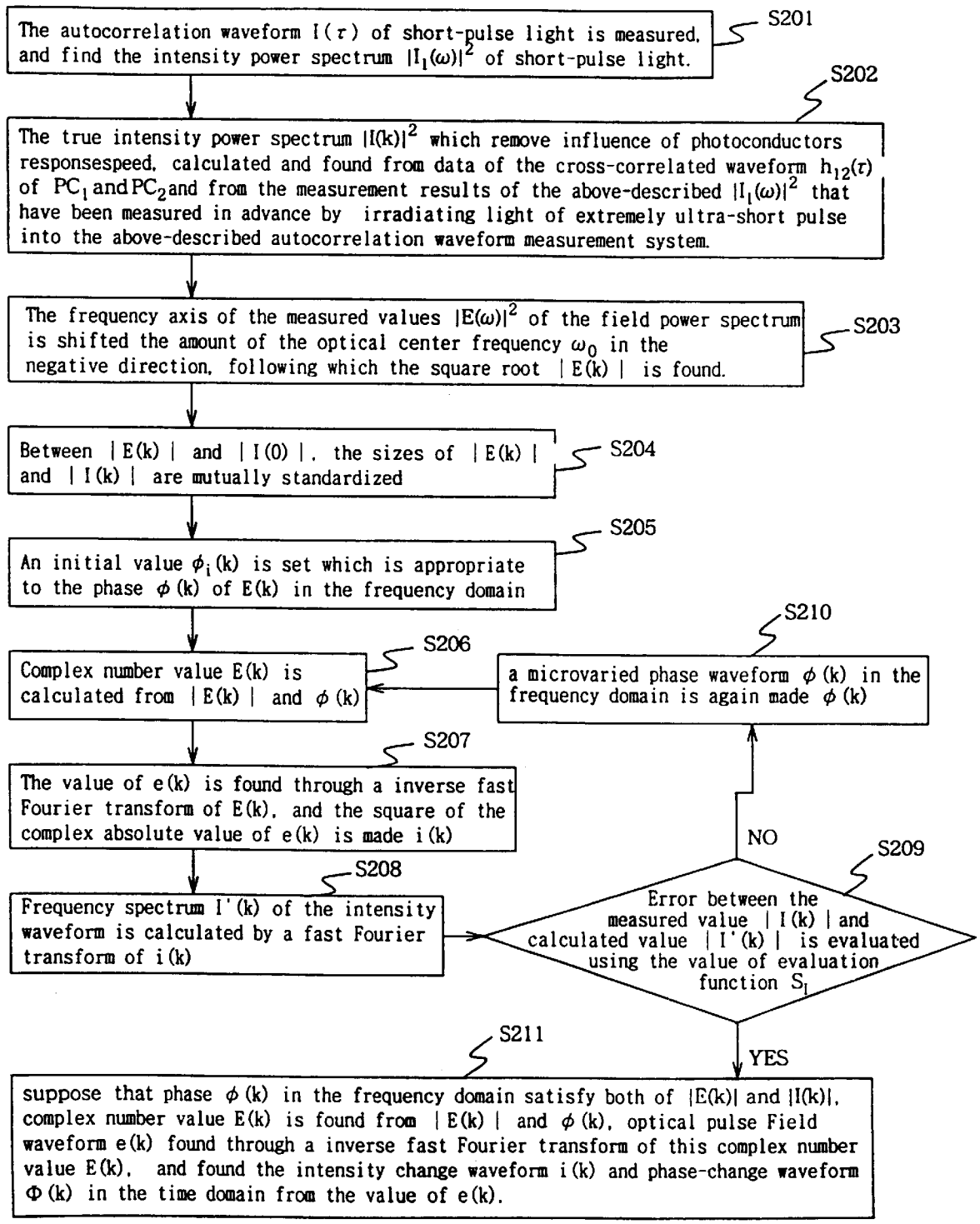
FIG. 3 is a flow chart showing the procedures of the light-pulse phase waveform reproduction operation that is carried out using the measurement results of optical spectrum analyzer 116 and the measurement results of the intensity power spectrum by waveform reproduction calculator 115 by means of the autocorrelation measurement system shown in FIG. 2.
Figure 4:
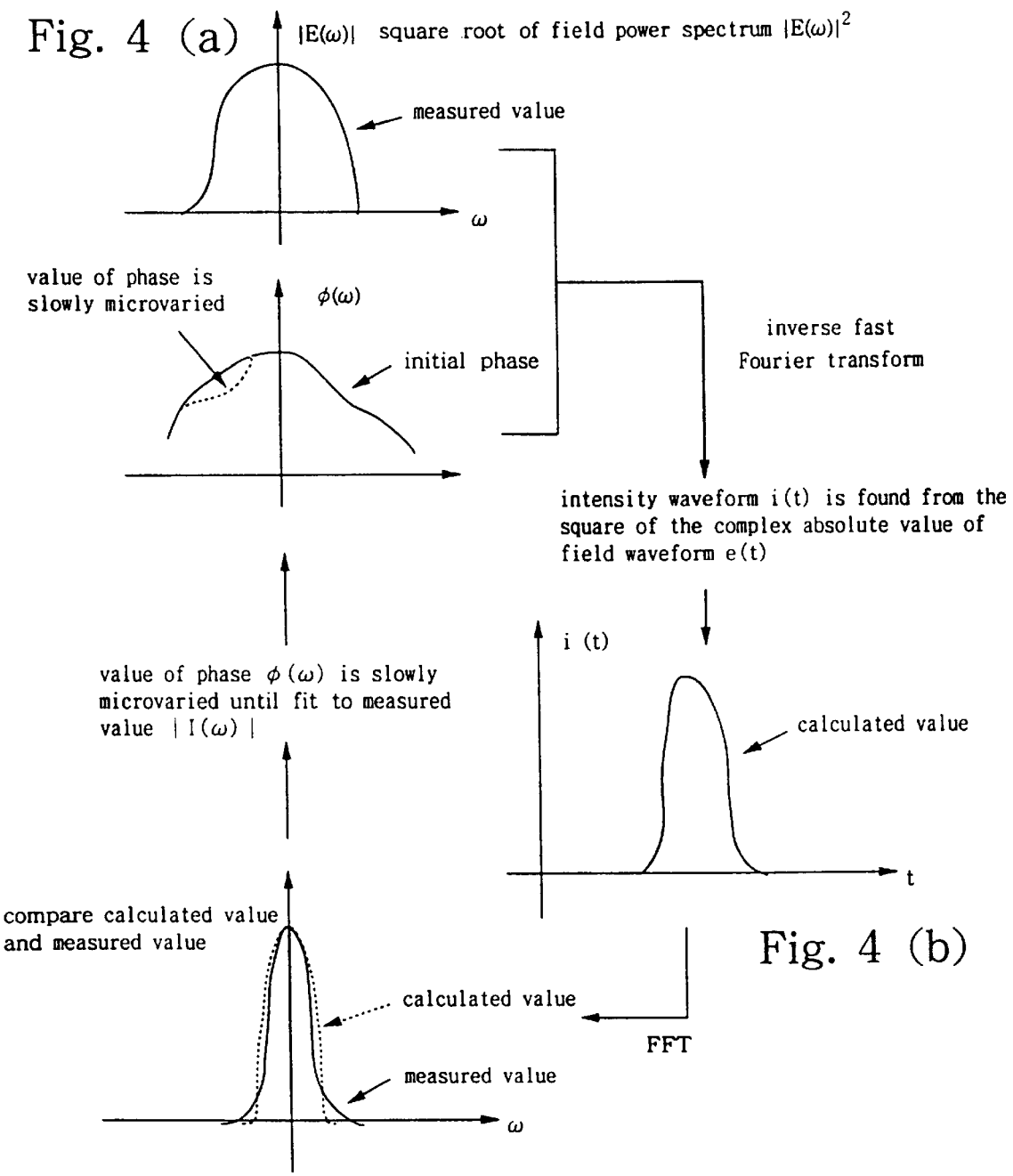
FIGS. 4(a)–4(c) shows a conceptual view of optical pulse waveform reproduction according to the present invention.

FIG. 3 shows a flowchart of the procedures for a reproduction operation on the intensity waveform as well as on the phase waveform of optical pulses using the results of measurement of the intensity power spectrum by waveform reproduction calculator 115 and the results of measurement by optical spectrum analyzer 116 in the above-described autocorrelation measurement system, and FIG. 4 shows a conceptual view of optical pulse waveform reproduction.

Light pulse waveform reproduction will first be summarized with reference to FIG. 4.

As shown in FIG. 4(a), an initial value $\phi_i(\omega)$ is set that is appropriate to the phase $\omega(\omega)$ of $E(\omega)$ in the frequency domain, and a complex number $E(\omega)$ is found from $|E(\omega)|$ and $\phi(\omega)$.

Next, as shown in FIG. 4(b), field waveform e(t) in the time domain is found through a inverse fast Fourier transform of complex number $E(\omega)$, and intensity waveform i(t) is found from the square of the complex absolute value of field waveform e(t).

As shown in FIG. 4(c), Fourier transform $I'(\omega)$ of the intensity waveform is then found through a fast Fourier transform of intensity waveform i(t), and the calculated value of this complex absolute value is made $|I'(\omega)|$. Calculated value $|I'(\omega)|$ and measured value $|I(\omega|$ are then compared, and the value of phase $\phi(\omega)$ is slowly microvaried such that the value of the error between these values decreases, and phase $\phi'(\omega)$ at which this error is a minimum is then found.

If the above-described phase $\phi'(\omega)$ can be determined, $E(\omega)$ can be found from $|E(\omega)|$ and $\phi'(\omega)$, a inverse fast Fourier transform is carried out, and the key of field waveform e(t) of optical short-pulse can be calculated. In addition, intensity waveform i(t) of optical short-pulse can be found from the square the complex absolute value of e(t), and the phase waveform in the time domain can be found from e(t).

The actual procedures of the waveform reproduction method will next be explained with reference to the flowchart shown in FIG. 3.

The flowchart of FIG. 3 shows the procedures for performing waveform reproduction of optical short-pulse using both the autocorrelation waveform data of the intensity waveform of optical short-pulse measured using two photoconductors and the field power spectrum data measured using the optical spectrum analyzer by means of the measurement system shown in FIG. 2. The operations of each step shown in FIG. 3 are explained hereinbelow.

Step S201: The autocorrelation waveform $I(\tau)$ of optical short-pulse is measured in an autocorrelation waveform measurement system employing two photoconductors, and $I(\tau)$ is subjected to a fast Fourier transform to find the intensity power spectrum $|I_1(k)|^2$ of optical short-pulse.

Here, k is an integer 0, 1, 2, ..., N−1, and N is the number of fast Fourier transform operations. Instances of variable k hereinbelow are defined in the same way.

Step S202: The true intensity power spectrum $|I(k)|^2$ can be calculated and found from data of the cross-correlated waveform $h_{12}(\tau)$ of the impulse response waveform $h_1(t)$ of first photoconductor 108 ($PC_1$) and the impulse response waveform $h_2(t)$ of second photoconductor 109 ($PC_2$) and from the measurement results of the above-described $|I_1(k)|^2$ that have been measured in advance by irradiating light of extremely ultra-short pulse into the above-described autocorrelation waveform measurement system.

Step S203: The frequency axis of the measured values $|E(k)|^2$ of the field power spectrum measured using an optical spectrum analyzer is shifted the amount of the optical center frequency $\omega_0$ in the negative direction, following which the square root $|E(k)|$ is found.

Step S204: Between $|E(k)|$ and $|I(0)|$, the sizes of $|E(k)|$ and $|I(k)|$ are mutually standardized such that the following relational equation is satisfied, and the results are again made $|E(k)|$ and $|I(k)|$. Here, N is the number of fast Fourier transform operations.

$$\frac{1}{N} \cdot \sum_{k=0}^{N-1} |E(k)|^2 = |I(0)|$$

Step S205: An initial value $\phi_i(k)$ is set which is appropriate to the phase $\phi(k)$ of $E(k)$ in the frequency domain.

Step S206: Complex number value $E(k)$ is calculated from $|E(k)|$ and $\phi(k)$.

Step S207: The value of e(k) (the field waveform in the time domain) is found through a inverse fast Fourier transform of $E(k)$, and the square of the complex absolute value of e(k) is made i(k) (the intensity waveform in the time domain).

Step S208: Frequency spectrum $I'(k)$ of the intensity waveform is calculated by a fast Fourier transform of i(k), following which complex absolute value $|I'(k)|$ is calculated.

Step S209: Error between the value $|I(k)|$ measured by standardizing in Step S204 and the above-described calculated value $|I'(k)|$ is evaluated using the value of evaluation function $S_I$ shown in the following equation:

$$S_1 = \frac{\sqrt{\sum_{k=0}^{N-1} (|I(k)| - I'(k)|)^2}}{\sum_{k=0}^{N-1} |I(k)|}$$

Step S210: When the value $S_I$ of the above-described error evaluation function exceeds a threshold value (a value on the order of 0.01–0.001), a microvaried phase waveform $\phi(k)$ in the frequency domain is again made $\phi(k)$, and the process is started again from Step S206. The operations of Steps S206–S210 are then repeated until the value of $S_I$ falls below the threshold value.

When the value $S_I$ of the error evaluation function falls below the threshold value, the phase $\phi(k)$ is established as the approximated solution that simultaneously satisfies $|E(k)|$ and $|I(k)|$.

Step S211: If the phase $\phi(k)$ of $E(k)$ in the frequency domain is found, complex number value $E(k)$ is found from measured value $|E(k)|$ and phase $\phi(k)$. Field waveform e(k) in the time domain of optical short-pulse can be found through a inverse Fourier transform of this complex number value $E(k)$.

Finally, the intensity-change waveform i(k) of optical short-pulse can be calculated and found from the square of the complex absolute value of e(k), and phase-change waveform $\Phi(k)$ in the time domain can be found from e(k).

The intensity waveform in the time domain was found in the above-described Step S207. Chirp frequency can be found by differentiating $\Phi(k)$ the phase change waveform $\Phi(k)$ in the time domain found in Step S211 and dividing by $2\pi$, and these values can be displayed on data display 114.

As a result of the construction described hereinabove, the present invention exhibits the following effect:

Both the intensity waveform of optical short-pulse and the change in chirp frequency over time can be found at high resolution.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. An optical short-pulse intensity waveform measurement method that finds an autocorrelation waveform of optical short-pulse to be measured by irradiating, at a delay time $\tau$, an optical short-pulse to be measured onto a first photoconductor that enters a conductive state when irradiated by light, and onto a second photoconductor that enters a conductive state only when irradiated by light at a time at which said first photoconductor is also in a conductive state; and characterized by finding a result $F(\omega)$ of a Fourier transform of an autocorrelation waveform of optical short-pulse to be measured; and dividing this result by the result of a Fourier transform of a cross-correlated waveform $h_{12}(\tau)$ of the impulse response waveform $h_1(t)$ of said first photoconductor and the impulse response waveform $h_2(t)$ of said second photoconductor to find an intensity power spectrum $|I(\omega)|^2$ from which response characteristics of photoconductors have been eliminated.

2. An optical short-pulse waveform reproduction method, which is a method of reproducing of a short-pulse waveform to be measured using a field power spectrum $|E(\omega)|^2$ and an intensity power spectrum $|I(\omega)|^2$ from which response characteristics of photoconductors have been eliminated by finding a result $F(\omega)$ of a Fourier transform of an autocorrelation waveform of optical short-pulse to be measured; and dividing this result by the result of a Fourier transform of a cross-correlated waveform $h_{12}(\tau)$ of the impulse response waveform $h_1(t)$ of a first photoconductor and the impulse response waveform $h_2(t)$ of a second photoconductor; characterized by:

calculating the square root of field power spectrum $|E(\omega)|^2$, and representing as $|E(\omega)|$ the result of shifting said square root exactly by an amount equal to the center frequency $\omega_0$ of optical short-pulse in the direction of the negative frequency axis, setting an initial value $\phi_i(\omega)$ appropriate to tis phase $\phi(\omega)$, and finding complex number $E(\omega)$ from $\omega E(\omega)|$ and $\phi(\omega)$;

finding field waveform e(t) in the time domain by inverse fast Fourier transform of complex number $E(\omega)$;

finding intensity waveform i(t) from the square of the complex absolute value of field waveform e(t);

finding a Fourier transform $I'(c)$ of the intensity waveform by a fast Fourier transform of intensity waveform i(t) and making the calculated value of the complex absolute value of this value $|I'(\omega)|$;

comparing calculated value $|I'(\omega)|$ and measured value $|I(\omega)|$, taking the difference as an error value, gradually microvarying the value of phase $\phi(\omega)$ such that said error value decreases, and finding phase $\phi(\omega)$ at which said error is a minimum; and finding complex number $E(\omega)$ from $|E(\omega)|$ and $\phi'(\omega)$ and calculating the solution of field waveform e(t) of optical short-pulse by means of an inverse fast Fourier transform, and finding optical short-pulse intensity waveform i(t) from the square of the complex absolute value of e(t) and phase waveform in the time domain from e(t).

* * * * *